(12) United States Patent
McKenzie et al.

(10) Patent No.: US 6,421,199 B1
(45) Date of Patent: Jul. 16, 2002

(54) METHOD AND APPARATUS FOR MINIMIZING ONCE PER REVOLUTION POSITIONAL ERRORS IN A DISC DRIVE

(75) Inventors: Lealon R. McKenzie, Edmond, OK (US); Robert D. Murphy, Boulder, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/401,895

(22) Filed: Sep. 23, 1999

Related U.S. Application Data

(60) Provisional application No. 60/101,898, filed on Sep. 25, 1998.

(51) Int. Cl.[7] .............................................. G11B 5/596
(52) U.S. Cl. ................................................... 360/77.04
(58) Field of Search .......................... 360/77.04, 77.03, 360/75; 369/44.32, 44.28

(56) References Cited

U.S. PATENT DOCUMENTS 3,716,845 A * 2/1973 Chaffin, III .......... 369/44.28 X
3,974,524 A * 8/1976 Griffiths et al. ............... 360/75
5,975,839 A * 11/1999 Ashby ...................... 414/798.1

* cited by examiner

Primary Examiner—David Hudspeth
Assistant Examiner—K. Wong
(74) Attorney, Agent, or Firm—John B. Phillips; Merchant & Gould P.C.

(57) ABSTRACT

A method for minimizing once per revolution (OPT) positional errors in a single disk servo track writer (STW) comprises clamping a disc in the servo track writer; spinning the disc at a predetermined speed; determining an average OPR positional error; and adjusting a reference position for writing servo tracks on the disc to include the average OPR positional error. The apparatus includes a distance measuring device positioned adjacent the disc in the STW. Another method for reducing the effects of OPR positional error in a disc drive comprises positioning a disc on a drive motor spindle in a disc drive during assembly of the drive; spinning the disc at a predetermined speed; determining the position of maximum peak to peak OPR position error, and then readjusting the position of the disc on the spindle to minimize the error. The apparatus for this method includes a controller, a distance sensor, and a positioner for nudging the disc to an optimum position on the disc drive spindle.

19 Claims, 6 Drawing Sheets

FIG.7-2

METHOD AND APPARATUS FOR MINIMIZING ONCE PER REVOLUTION POSITIONAL ERRORS IN A DISC DRIVE

RELATED APPLICATIONS

This application is related to U.S. patent application Ser. No. 09/401,877, filed on Sep. 23, 1999 and claims the benefit of the filing date of U.S. Provisional Patent Application Serial No. 60/101,898 filed Sep. 25, 1998 and entitled "MINIMIZING OPR DURING SINGLE DISK STW".

FIELD OF THE INVENTION

This application generally relates to hard disc drives and more particularly to an apparatus and method for optimizing the disc orientation on a disc drive motor spindle in a disc drive head disc assembly.

BACKGROUND OF THE INVENTION

In a hard disc drive magnetic data storage device, servo data and user data are magnetically written and read from magnetic tracks laid cut on an upper and/or lower surface layer deposited on a flat rotating disc in the drive. Accurate location of the tracks and accurate positioning of the read/write heads carried by an actuator assembly is critical to the optimal operation of these drives. The concentricity of the tracks with respect to the rotational center of the drive motor spindle is paramount to facilitating closer and closer track spacing as the demands for higher densities of data storage increase with each generation of disc drives. However, there is always some error present in the concentricity of the tracks with respect to the disc center and the drive motor spindle center. The non-concentricity error is termed Once Per Revolution (OPR) positional error.

There are two basic methods of writing servo tracks on these drives. The first method is to write the servo tracks in a servo track writer (STW) on each disc individually prior to drive assembly, separate from the disc "pack", and then stacking the discs on the drive motor spindle to assemble the pack and the overall drive. This method requires a separate, single disc servo track writer, into which each disc is placed and written. The second method is to assemble the drive motor onto the drive base plate, the discs onto the drive motor spindle in the drive into a disc "pack", and then insert the partially assembled drive into a "Pack-writer" to write the servo tracks on the discs in the pack. This pack-writer utilizes the drive's actuator assembly to write the tracks and utilizes apertures in the disc drive housing in conjunction with a laser interferometer to index and position the heads or a push pin contact with an external positioner to position the heads during the STW process.

This latter, pack-writing process is an extra step in the drive manufacturing sequence that can be avoided if the servo tracks on the discs are previously written in the single disc STW process. One problem in a single disc STW process, however, is that OPR positional errors, resulting from non-concentricity of the drive motor spindle with the inner edge of the disc, are compounded with written-in OPR positional errors, resulting from non-concentricity of the STW spindle and the inner edge of the disc. As each disk is stacked on the drive motor spindle there can be an error in concentricity of the disc with the drive center. Further, during the single disc STW process, there is a dimensional tolerance between the disc inner diameter (ID) and the STW spindle outer diameter (OD). These two different tolerances can introduce compounded error in the concentricity of the written servo tracks with respect to the disc center in the actual disc drive. Further, when several discs written by the single disc STW process are stacked on a drive spindle during drive manufacture, these non-concentricity errors or OPR errors can further compound such that the peak to peak OPR error in the assembled stack can be several mils or more.

The single disc STW uses the STW spindle center as the base reference for determining the track locations. A single disc STW can generate errors in track writing once per revolution (OPR) errors from head to head across 100's of tracks. These errors compound when such written discs are assembled into an actual disc drive. Therefore there is a need for a method for accurately reducing the potential peak to peak OPR errors that can result when single disc STW process is used.

Because it is preferable that the magnetic tracks on a disc be concentric with the drive motor spindle, there is a need for an invention that would position the discs, during the disc pack assembly process, such that the potential peak to peak OPR errors are minimized, meaning that the average outer edge dimensions of the respective discs are concentric with the rotational center of the drive motor spindle.

SUMMARY OF THE INVENTION

The method and apparatus in accordance with the present invention addresses the above identified need. The method involves loading the discs onto a drive motor spindle with the motor mounted on a disc drive base plate assembly, measuring, for each disc, the location of the outer edge of the disc at various phase angles, adjusting each disc so as to minimize the peak to peak OPR error, and clamping the discs into the disc assembly.

This method reduces the non-concentricity of the disc's outer edge with respect to the drive motor spindle. By orienting the disc in this fashion, the non-concentricity of its magnetic tracks with respect to the drive motor spindle is minimized.

These and various other features as well as advantages which characterize the present invention will be apparent from a reading of the following detailed description and a review of the associated drawings.

BRIEF DESCRIPTION OF THE DRAWINGS

FIGS. 7-1 and 7-2 are flow diagrams of a preferred embodiment of the method in accordance with the present invention.

DETAILED DESCRIPTION

Figure 1:
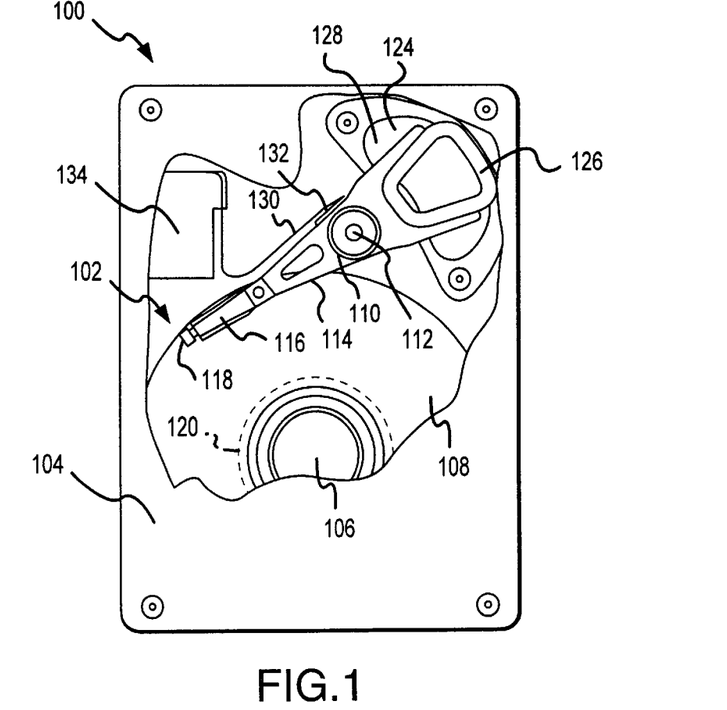
FIG. 1 is a schematic representation of a disc drive written in accordance with a preferred embodiment of the invention.

A disc drive 100 constructed in accordance with a preferred embodiment of the present invention is shown in FIG.

1. The disc drive 100 includes a base 102 to which various components of the disc drive 100 are mounted. A top cover 104, shown partially cut away, cooperates with the base 102 to form an internal, sealed environment for the disc drive in a conventional manner. The components include a spindle motor 106 which rotates one or more discs 108 at a constant high speed. Information is written to and read from tracks on the discs 108 through the use of an actuator assembly 110, which rotates about a bearing shaft assembly 112 positioned adjacent the discs 108. The actuator assembly 110 includes a plurality of actuator arms 114 which extend towards the discs 108, with one or more flexures 116 extending from each of the actuator arms 114. Mounted at the distal end of each of the flexures 116 is a head 118 which includes an air bearing slider enabling the head 118 to fly in close proximity above the corresponding surface of the associated disc 108.

The spindle motor 116 is typically de-energized when the disc drive 100 is not in use for extended periods of time. The heads 118 are moved over park zones 120 near the inner diameter of the discs 108 when the drive motor is de-energized. The heads 118 are secured over the park zones 120 through the use of an actuator latch arrangement, which prevents inadvertent rotation of the actuator assembly 110 when the heads are parked.

The radial position of the heads 118 is controlled through the use of a voice coil motor (VCM) 124, which typically includes a coil 126 attached to the actuator assembly 110, as well as one or more permanent magnets 128 which establish a magnetic field in which the coil 126 is immersed. The controlled application of current to the coil 126 causes magnetic interaction between the permanent magnets 128 and the coil 126 so that the coil 126 moves in accordance with the well known Lorentz relationship. As the coil 126 moves, the actuator assembly 110 pivots about the bearing shaft assembly 112 and the heads 118 are caused to move across the surfaces of the discs 108.

A flex assembly 130 provides the requisite electrical connection paths for the actuator assembly 110 while allowing pivotal movement of the actuator assembly 110 during operation. The flex assembly includes a printed circuit board 132 to which head wires (not shown) are connected; the head wires being routed along the actuator arms 114 and the flexures 116 to the heads 118. The printed circuit board 132 typically includes circuitry for controlling the write currents applied to the heads 118 during a write operation and for amplifying read signals generated by the heads 118 during a read operation. The flex assembly terminates at a flex bracket 134 for communication through the base deck 102 to a disc drive printed circuit board (not shown) mounted to the bottom side of the disc drive 100.

Figure 2:
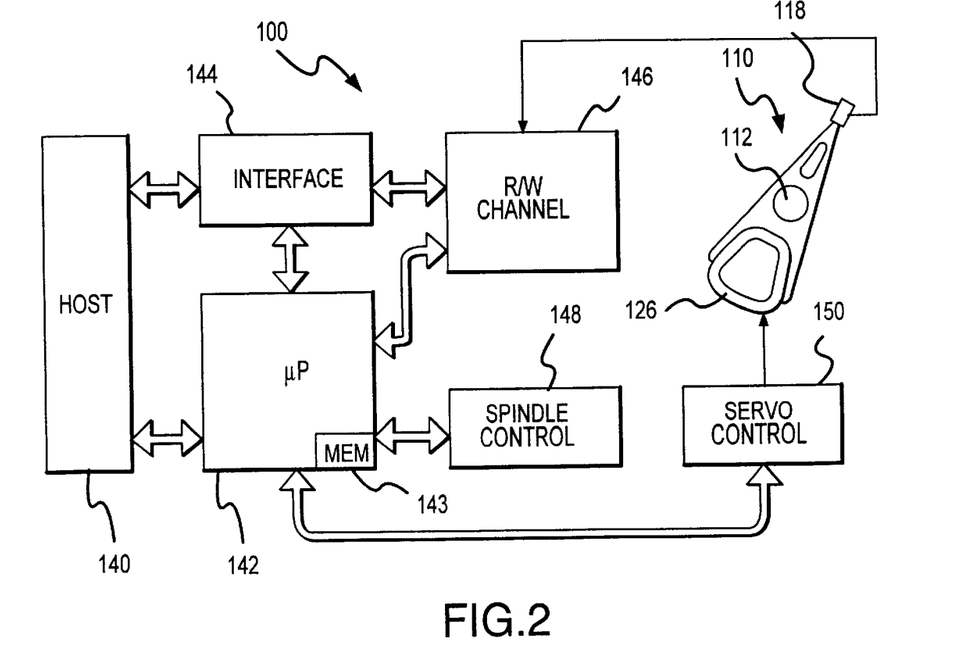
FIG. 2 illustrates a disc drive system connected to a host for the disc drive of FIG. 1.

Referring now to FIG. 2, shown therein is a functional block diagram of the disc drive 100 of FIG. 1, generally showing the main functional circuits which are resident on the disc drive printed circuit board and used to control the operation of the disc drive 100. The disc drive 100 is shown in FIG. 2 to be operably connected to a host computer 140 in which the disc drive 100 is mounted in a conventional manner. Control communication paths are provided between the host computer 140 and a disc drive microprocessor 142, the microprocessor 142 generally providing top level communication and control for the disc drive 100 in conjunction with programming for the microprocessor 142 stored in microprocessor memory (MEM) 143. The MEM 143 can include random access memory (RAM), read only memory (ROM) and other sources of resident memory for the microprocessor 142.

Data is transferred between the host computer 140 and the disc drive 100 by way of a disc drive interface 144, which typically includes a buffer to facilitate high speed data transfer between the host computer 140 and the disc drive 100. Data to be written to the disc drive 100 are thus passed from the host computer to the interface 144 and then to a read/write channel 146, which encodes and serializes the data and provides the requisite write current signals to the heads 118. To retrieve data that has been previously stored by the disc drive 100, read signals are generated by the heads 118 and provided to the read/write channel 146, which performs decoding and error detection and correction operations and outputs the retrieved data to the interface 144 for subsequent transfer to the host computer 140. Such operations of the disc drive 100 are well known in the art and are discussed, for example, in U.S. Pat. No. 5,276,662 issued Jan. 4, 1994 to Shaver et al.

The discs 108 are rotated at a constant high speed by a spindle control circuit 148, which typically electrically commutates the spindle motor 106 (FIG. 1) through the use of back electromotive force (BEMF) sensing. The radial position of the heads 118 is controlled through the application of current to the coil 126 of the actuator assembly 110. A servo control circuit 150 provides such control.

Figure 3:
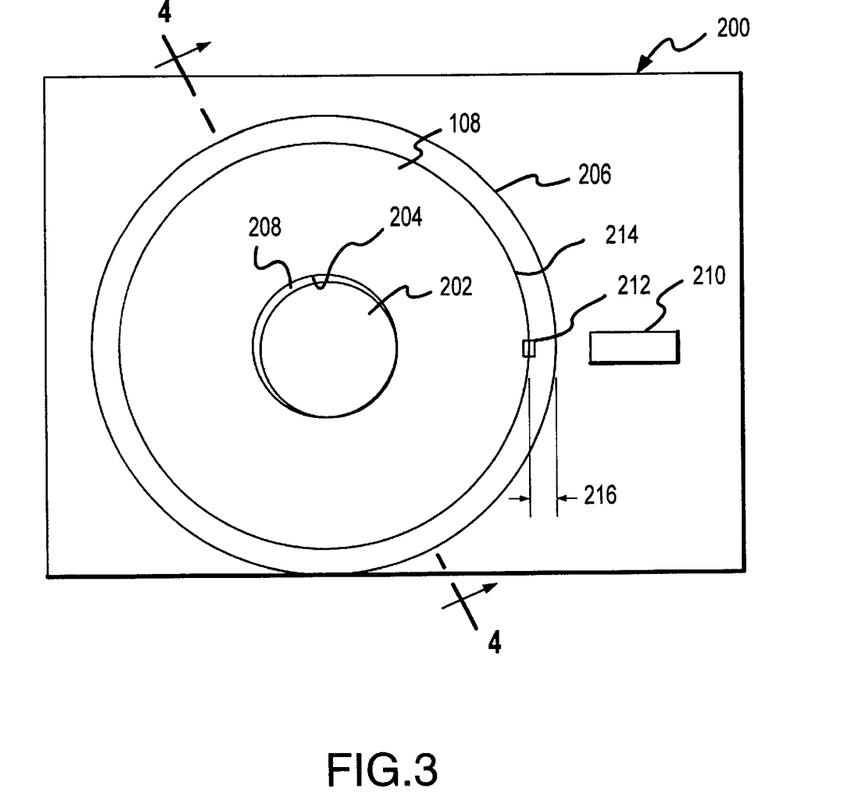
FIG. 3 is a top schematic representation of a disc mounted on the motor hub in a servo track writer in accordance with a preferred embodiment of the present invention.
Figure 4:
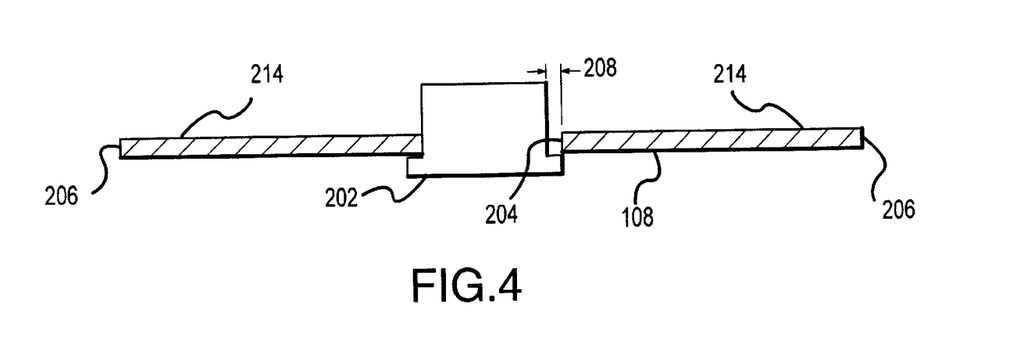
FIG. 4 is a schematic sectional representation of the disc mounted on the motor hub in FIG. 3.

A single disc servo track writer (STW) 200 in accordance with a first embodiment of the invention is schematically shown in a plan view in FIG. 3. The STW 200 has a motor spindle 202 upon which a disc 108 is mounted for rotation and servo track writing. A cross sectional view of the disc 108 on the STW 200 spindle 202 is shown in FIG. 4 illustrating the dimensional error that can arise due to manufacturing tolerance. The disc 108 is an annular flat disc with an inner diameter(ID) aperture edge 204 and an outer diameter (OD) edge 206.

The positioning of the disc 108 on the spindle 202 results in a maximum gap 208 between the spindle 202 outer surface and the ID edge 204 of the disc 108. For example, the gap 208 of permissible error due to manufacture tolerance may be as much as 0.088 mm between the spindle 202 and the inner ID 204 of the disc 108 as shown.

A position measuring device having a sensor such as a capacitance or laser interferometer 210 is positioned adjacent the mounted disc 108 in the STW 200. As the disc 108 is rotated, the interferometer 210 measures the mounted non-concentricity of the disc 108 by measuring the distance from the interferometer 210 to the edge 206 of the disc 108. The peak to peak variation of distance measurement is the edge roughness. The Once Per Revolution (OPR) positional error phase to the edge 206 equates to the relative rotational position of the peak to peak signal. The average OPR positional error and phase are computed. This value, in accordance with the present invention, is then added to the STW servo reference and is utilized as the reference position of the edge 206 for positioning the STW track writing head 212 while writing each of the tracks 214. The dimension 216 in FIG. 3 would thus change by the roughness of the disk edge. The result is that all STW written tracks will be written concentric with the average outer edge dimensions. This reduces the positional errors in the servo track writing process simply to the measurement and STW accuracy. For example, present laser interferometers have a 12 bit DAC with 4096 counts times a resolution of between 0.3 to 100 micro-inches. For 4 mils of absolute motion the measurement resolution could be as low as 1 micro-inch. This resolution is well within the normal range of expected thermal OPR positional error changes in an assembled disc pack.

A typical disc has the following dimensional specifications:

Inner diameter (ID)=25 mm+0.05 mm−0.0 mm.
Outer Diameter (OD)=95 mm+0.1 mm−0.1 mm.
Concentricity ID to OD=+0.05 mm.

Using these dimensions, if the ID/OD concentricity is aligned to subtract from the spindle to disk gap 208, the ID to track distance difference is 0.088 mm. The OD to track distance difference is 0.038 mm. Utilizing these same dimensions, if the ID/OD concentricity is aligned to add to the spindle to disk gap 208, the ID to track distance is again 0.088 mm. However, the OD to track distance difference is 0.138 mm.

In contrast, as is shown by the dimensional values in FIG. 4, utilizing the edge STW technique in accordance with the present invention, with the ID/OD concentricity aligned to add to the spindle to disk gap 208, the ID to track distance difference is 0.05 mm. The OD to track distance difference is 0.0 mm.

Figure 5:
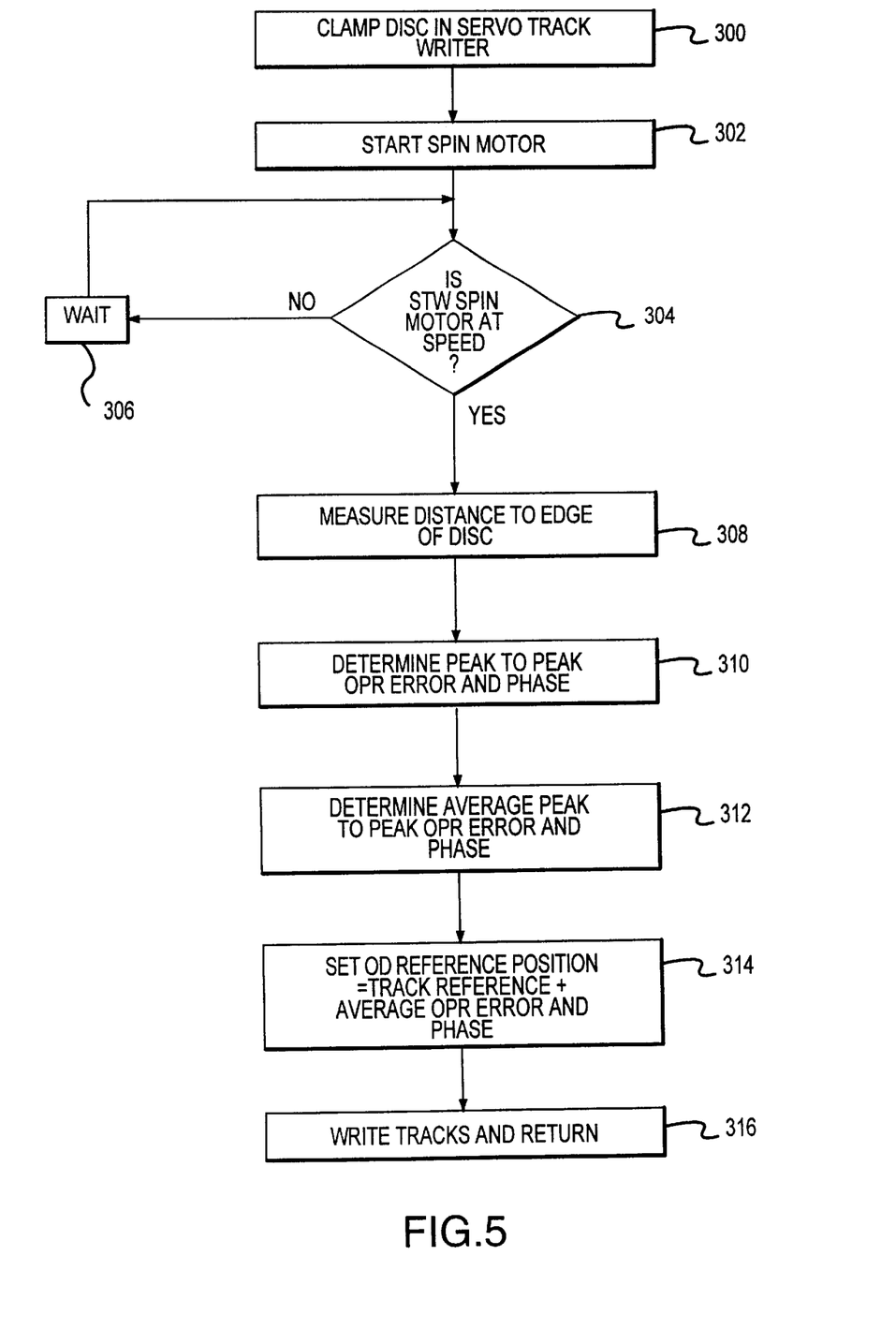
FIG. 5 is a flow diagram of a preferred embodiment of the method in accordance with the present invention.

The method in accordance with the first embodiment of the invention may be more readily understood with reference to the STW software operational steps shown in FIG. 5.

In operation 300 the disc to be written is clamped in the servo track writer 200. Control then transfers to microcomputer operation 302 where the STW spin motor is energized. Control then transfers to query operation 304 in which query is made whether the STW spin motor is at the required speed. If not, control transfers to wait operation 306 and then back to query operation 304. This loop continues until the STW motor is at the required speed. Control then transfers to operation 308.

In operation 308, the measuring device, such as interferometer 210, begins measuring the distance to the edge 206 and stores the actual distance at each angular position of the rotating disc until a steady set of measurements has been accumulated. Control then transfers to operation 310 where the peak to peak once per revolution positional error is determined along with the corresponding phase signal. Control then transfers to operation 312 where the STW microcomputer determines the peak to peak average OPR error and phase values for the disc as a whole. Control then transfers to operation 314 where the outer diameter (OD) reference position is set equal to the track reference plus the average OPR error and phase value. This modified reference value is then utilized in operation 316 to correctly center and position the write head 212 to write each of the hundreds of tracks on each side of the disc 108.

The result is that all of the written tracks are concentric with the average OPR position error of the disc OD and thus when the discs are subsequently assembled into an actual disc drive 100, the track positional errors are substantially only due to the manufacturing tolerances of the actual drive motor spindle to disc ID dimensions.

Figure 6:
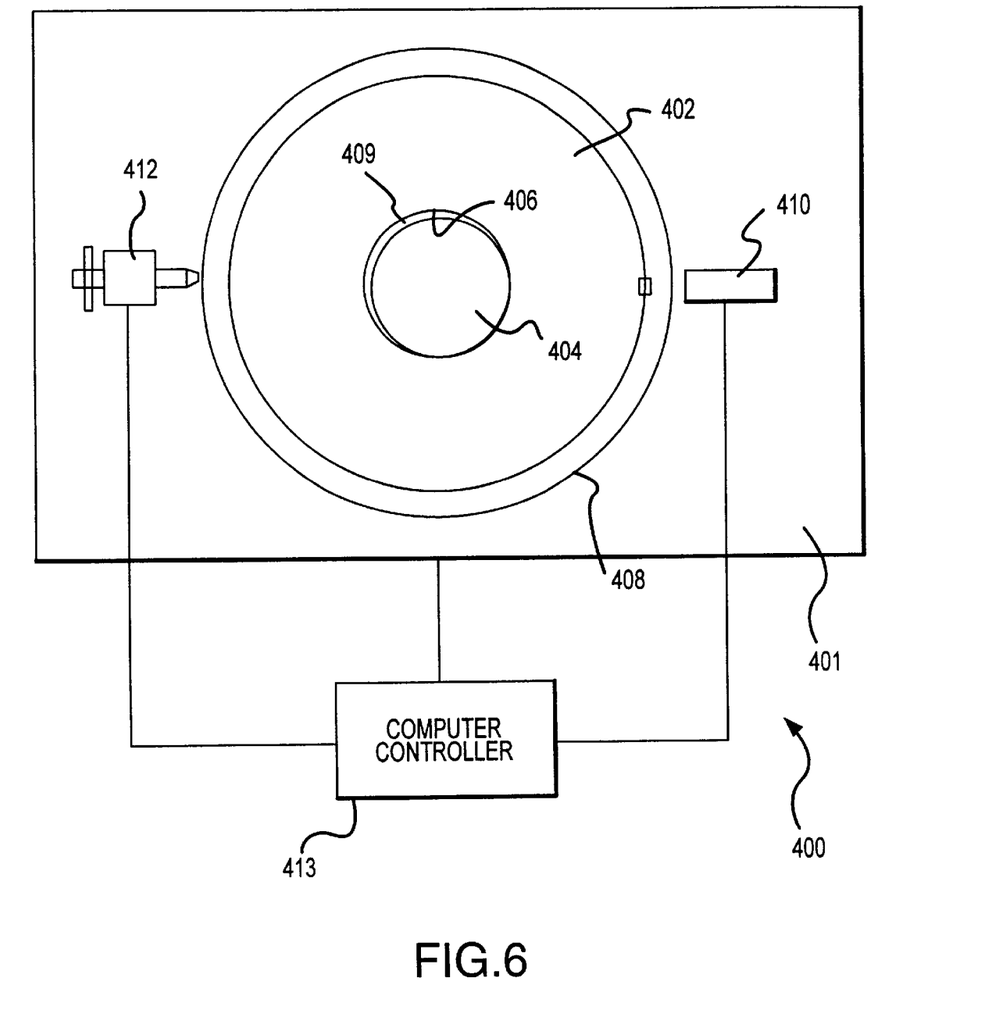
FIG. 6 is a simplified top schematic representation of a disc mounted on a drive motor spindle in a disc drive in accordance with a preferred embodiment of the present invention.

A disc aligning or balancing apparatus 400 in accordance with another aspect of the present invention is shown in a simplified plan view in FIG. 6. The disc balancing apparatus 400 operates upon a disc 402 that has been mounted upon a drive motor spindle 404 of a disc drive motor fastened to a disc drive baseplate 401 to optimally orient the disc on the spindle. The disc is an annular flat disc with an inner diameter (ID) edge 406 and an outer diameter (OD) edge 408. The balancing apparatus 400 includes a position sensor 410, a positioning element 412, and a controller 413. The controller 413 is connected to the position sensor 410, the positioning element 412, and to the disc drive motor which rotates the spindle 404. The controller 413 receives, stores, and manipulates position and phase data and controls the spin motor to spin and accurately orient the spindle 404. The position sensor 410 and positioning element 412 are temporarily lowered onto and preferably precisely positioned on the disc drive baseplate 401 during the balancing or aligning operations during drive assembly as will be subsequently explained.

The positioning of each disc 402 on the drive motor spindle 404 typically results in a non-concentric orientation of the disc 402 with respect to the axis of the drive motor spindle 404. This non-concentricity is generally associated with a manufacturing tolerance gap 409 between the ID edge 406 of the disc 402 and the OD of the drive motor spindle 404.

In the balancing apparatus 400, the position sensor, such as a capacitance or laser interferometer 410, is positioned adjacent the disc 402 in a predetermined registry position, for example, by engaging a suitable boss or other design feature in the baseplate 401. As the disc 402 is rotated, the interferometer 410 measures the non-concentricity of the disc by measuring the distance from the interferometer 410 to the OD edge 408 of the disc 402. Variances in this measurement reveal non-concentricity and OD edge 408 roughness. As the interferometer 410 measures the aforementioned distance, the controller 413 for the drive motor spindle 404 tracks the spindle position and its present phase angle with each distance measurement.

A positioning element 412 is positioned adjacent to the disc 402, preferably opposite the interferometer 410. The positioning element 412 is able to adjust the position of the disc 402 relative to the drive motor spindle 404 by applying force to the OD edge 408 of the disc 402. The positioning element 412 may be, for example, a precision solenoid driven plunger with a soft tip for nudging against the disc edge as will be subsequently explained. The phase of the adjustment is preferably controlled by the controller 413 controlling the phase of the drive motor for the spindle 404.

The disc balancing apparatus 400 operates by making use of the measured distance and corresponding phase data to instruct the drive motor spindle 404 and positioning element 412 to cooperate in adjusting the misaligned disc 402 to minimize the OPR position error of the disc. This results in the average dimensions of the OD edge 408 of the disc 402 being positioned concentric with the drive motor spindle 404.

Figure 71:
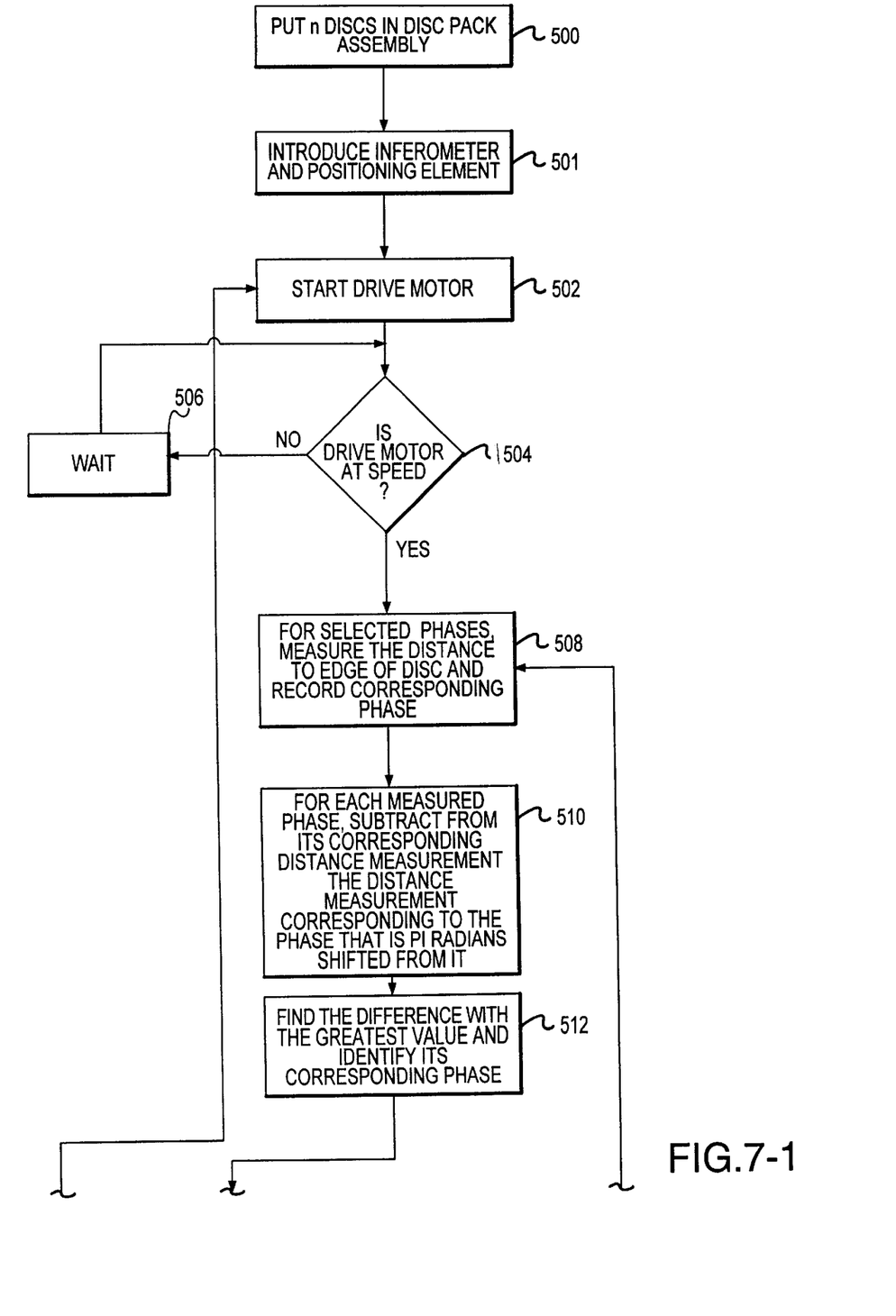
Figure 72:
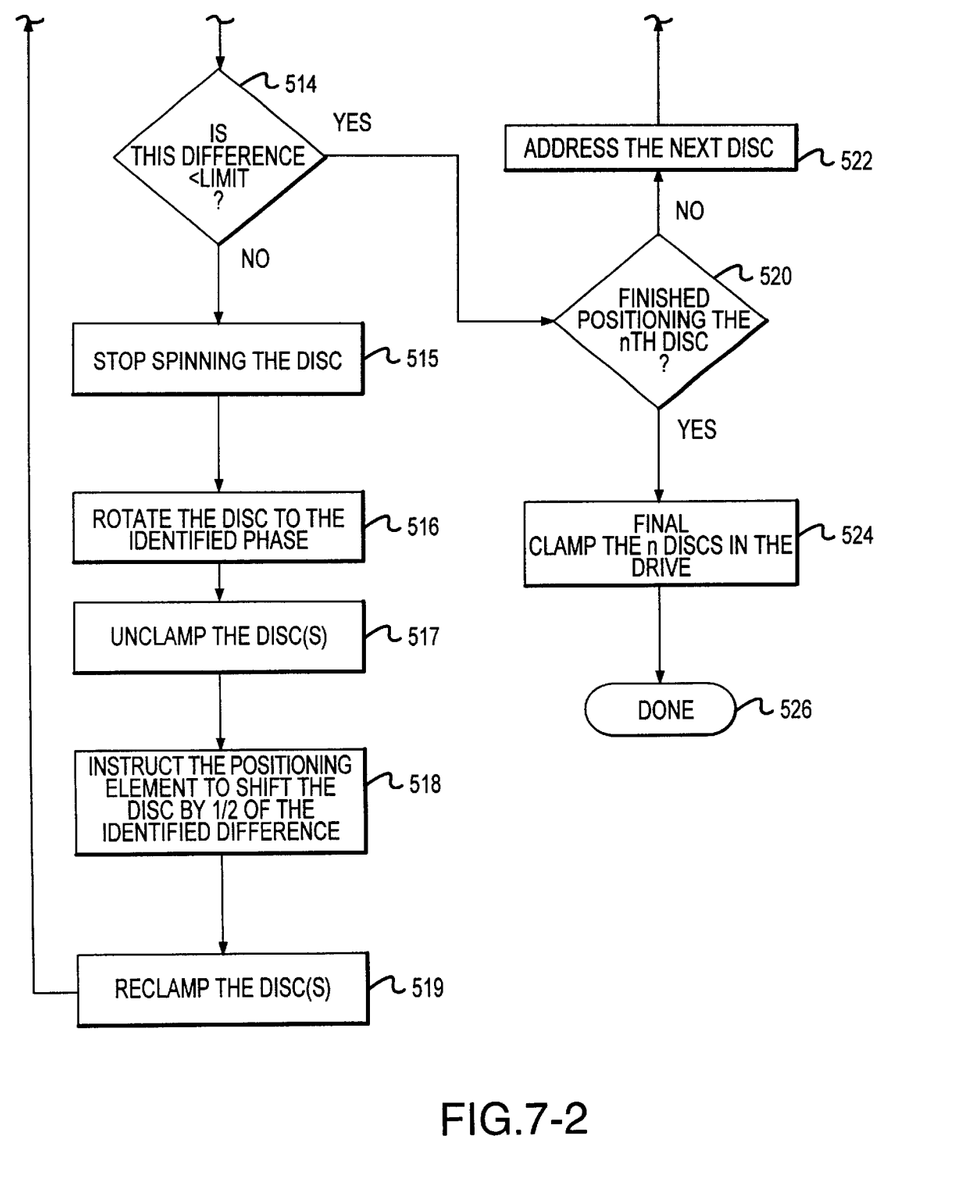

One preferred method of aligning the discs, in accordance with this aspect of the present invention, is shown in FIG. 7. In operation 500, the disc 402 to be adjusted is placed on the drive motor spindle 404, previously mounted on the drive baseplate 401. The disc is temporarily clamped to the spindle 404. Then, the interferometer 410 is brought into the defined position adjacent the OD edge 408 of the disc 402 and the positioning element 412 is similarly brought into a predefined position, preferably opposite to that of the interferometer 410.

Control then transfers to operation 502 in which the spin motor is activated. Control then transfers to query operation 504 in which inquiry is made regarding whether the drive motor is at the required speed. If not, control transfers to a wait operation 506 and then returns to query operation 504 where the rotational speed is again sensed and queried. This loop continues until the drive motor has reached the desired speed. Control then transfers to operation 508.

In operation 508, the interferometer 410 measures the distance between itself and the OD edge 408 of the disc 402. The controller 413 then associates this measurement with associated phase data from the drive motor spindle 404. This measurement process is repeated for various phases and may be done continuously as the disc is rotated until a complete picture of the disc is collected. Control then transfers to operation 510 in which each distance measurement is reduced by the distance measurement associated with the phase angle π radians therefrom. Control then transfers to operation 512 in which the set of differences created in operation 510 is examined to identify the largest difference therein and its associated phase or angular position of the spindle 404. Control then transfers to query operation 514.

In query operation 514, inquiry is made regarding whether the greatest difference identified in operation 512 is less than a desired limit. If the identified difference exceeds the limit, control transfers to operation 515 wherein the disc rotation is stopped. Control then transfers to operation 516 in which the disc 402 is slowly rotated to the phase or angular position identified in operation 512. Control then transfers to operation 517 where the clamp on the disc is loosened so that the position of the disc on the spindle 404 may be adjusted. Control then transfers to operation 518 in which the positioning element 412 is instructed by the controller 413 to shift the disc by one-half of the difference identified in operation 512. Control then transfers to operation 519 where the clamp is re-tightened temporarily. Control then returns to operation 502 and the drive motor is re-energized. The loop sequence of operations 502 through 519 is repeated until the difference identified in operation 512 is less than the desired limit. When the answer to query 514 is yes, and thus the loop is exited, control is transferred to query operation 520.

In query operation 520, inquiry is made regarding whether every disc in the disc pack assembly has been adjusted. If this is not the case, control is transferred to operation 522 wherein the interferometer 410 and positioning element 412 address the next disc. Control is then returned to operation 508. This loop is traversed until all of the discs have been adjusted. When every disc has been adjusted, control in operation 520 is transferred to operation 524 where the discs are permanently clamped in place whereupon the process is finished and the apparatus 400 is removed from the baseplate 401 and the remainder of the assembly process is continued. The apparatus 400 of the present invention thus also compensates for tolerances in the spindle itself, since the result is the centering of the disc 402 about the actual spin axis.

There are many variations of the apparatus 400 and the method described above. The disc unclamping and clamping steps 517 and 519 may be omitted if, in operation 500, when the discs are assembled into the disc pack assembly, the discs are lightly clamped with sufficient force to hold them in place during steps 502 through 518. A further embodiment of the present invention could have multiple interferometers 410 and multiple positioning elements 412 to accommodate a disc drive possessing more than one disc 402. Such an embodiment would operate by having each interferometer 410 and positioning element 412 associated with a given disc 402 cooperate in adjusting the misaligned disc 402 to minimize the OPR error measurements. This results in the average dimensions of the OD edge 408 of each disc 402 being concentrically optimized with respect to the axis of the drive motor spindle 404.

A further embodiment of the present invention could have a single interferometer 410 and a single positioning element 412 that each is vertically translatable such that they are able to address each disc 402 in a disc drive possessing multiple discs 402. Such an embodiment would operate upon each disc 402 sequentially, with the interferometer 410 and positioning element 412 cooperating in adjusting each disc 402 to minimize the OPR error measurements. This results in the average dimensions of the OD edge 408 of each disc 402 being positioned concentric with the actual spin axis of the drive motor spindle 404.

To summarize the present invention, the non-concentricity of a disc (such as 402) can be minimized in a disc drive during drive assembly using the following steps. First, a disc (such as 402) having an outer edge (such as 408) is placed on (such as in operation 502) and rotated (such as in operations 504 through 506) at a given speed on a drive motor spindle (such as 404) mounted on a drive baseplate (such as 401). Next, the distance from the outer edge of the disc (such as 408) to a predetermined point is measured (such as in operation 508), and the distance measurement is associated with the phase angle of the disc (such as 402) at the time of measurement. Then, the phase and distance measurements are utilized (such as in operations 510 through 518) to adjust the disc so as to minimize the peak to peak once per revolution error. The process is then repeated until the error is within a tolerance limit (such as determined in operation 514).

In the disc balancing apparatus (such as 400), a distance detector (such as 410) is removably positioned (such as in operation 501) a given distance from the disc (such as 402) mounted on a drive motor spindle (such as 404) fastened to a disc drive baseplate (such as 401). The drive controller (such as 413) determines the phase angle of the disc for each distance measurement. The step of measuring (such as in operation 508) involves sensing a distance signal from the disc edge to the detector location and recording the distance signal at each of the intervals during a disc revolution and associating the distance measurements with the phase angle of the disc at the moment the measurements are taken.

The disc balancing apparatus (such as 400) has a positioning element (such as 412), a distance sensor (such as 410), and a controller (such as 413) for receiving distance and phase data and controlling the spin motor, and the tightening and loosening of the disc clamp (such as in operations 517, 519 and 524). The controller processes the distance and phase data (such as in operations 510, 512 and 514) and controls the stopping and starting of the spin motor and clamping of the discs (such as in operations 502, 517, 519, and 524). The controller 413 also directs the positioning element (such as in operation 518) to adjust the disc (such as 402) such that the non-concentricity of the disc (such as 402) with respect to the drive motor spindle (such as 404) is minimized.

Upon completion of the adjustment process for a disc, the controller 413 further checks (such as in operation 520) whether additional discs are in the pack and then either addresses the next disc (such as in operation 522) or finally clamps the discs in the disc pack (such as in operation 524, and then completes the process (such as in operation 526, e.g. returns control of the disc drive assembly process to a main sequence of operations, not shown.

It will be clear that the present invention is well adapted to attain the ends and advantages mentioned as well as those inherent therein. While a presently preferred embodiment has been described for purposes of this disclosure, numerous changes may be made which will readily suggest themselves to those skilled in the art and which are encompassed in the spirit of the invention disclosed and as defined in the appended claims.

What is claimed is:

1. A method for optimizing a mounted position of a disc with respect to a rotational axis of a drive motor spindle on which the disc is mounted, comprising acts of:

a) spinning the disc on the drive motor spindle;

b) measuring distance from the outer edge of the disc at various phase angles to a predetermined point as the disc is spun on the spindle to render a distance measurement from the outer edge of the disc to the predetermined point at each of the various phase angles;

c) recording the distance measurement at each of the various phase angles;

d) determining a once per revolution (OPR) position error for the disc from the distance measurements recorded in act c); and e) adjusting the position of the disc on the drive spindle to minimize the OPR position error.

2. The method according to claim 1 wherein a distance detector is aligned adjacent to the spinning disc and the measuring act is accomplished by acts of:

(b)(i) sensing a distance signal from the disc edge to the detector location;

(b)(ii) recording the distance signal at intervals while the disc is rotating; and (b)(iii) associating each distance signal recorded with a phase angle at the time of recording.

3. The method according to claim 1 wherein the act d) of determining a once per revolution (OPR) error includes determining a maximum peak to peak OPR positional error signal.

4. The method according to claim 1 wherein the determining act d) comprises acts of:

(d)(i) reducing each recorded distance measurement by a distance measurement taken at a phase angle pi radians from the phase angle of each recorded distance measurement to obtain a difference value associated with each recorded distance measurement;

(d)(ii) associating each difference value with the phase angle of the recorded distance measurement from which the distance measurement taken at the phase angle pi radians is subtracted; and (d)(iii) identifying a greatest difference value of the difference values obtained in act (d)(i).

5. The method according to claim 4, wherein the adjusting act e) comprises acts of:

(e)(i) turning the disc to the phase angle associated with the greatest difference value; and (e)(ii) adjusting the disc by displacing the disc one-half of the greatest difference value.

6. The method according to claim 1 wherein the determining act (d) comprises acts of:

(d)(i) reducing each recorded distance measurement by a distance measurement taken at an opposite edge of the disc to obtain a difference value associated with each recorded distance measurement;

(d)(ii) associating each difference value with the phase angle of the recorded distance measurement from which the distance measurement taken at the opposite edge of the disc is subtracted; and (d)(iii) identifying a greatest difference value of the difference values obtained in act (d)(i).

7. The method according to claim 6, wherein the adjusting act e) comprises acts of:

(e)(i) turning the disc to the phase angle associated with the greatest difference value; and (e)(ii) shifting the disc by one-half of the greatest difference value.

8. The method according to claim 7, further comprising an act of:

f) repeating acts (a) through (e) until the greatest difference value is less than a predetermined limit value.

9. The method according to claim 1 wherein the measuring act (b) is performed utilizing an interferometer.

10. The method according to claim 1 wherein the measuring act (b) is performed utilizing a laser interferometer.

11. A drive balancing apparatus comprising:

a controller operable to controllingly spin a disc about an axis;

a distance detector connected to the controller and operable to measure the disc; and a positioning element connected to the controller and operable to shift the disc relative to the axis.

12. The apparatus according to claim 11 wherein the distance detector and the positioning element are both removably positioned at predetermined locations on the disc drive baseplate.

13. The apparatus according to claim 11 wherein the distance detector is positioned on a disc drive baseplate a predetermined distance from the disc mounted on the spindle.

14. The drive balancing system according to claim 11 wherein the distance detector is an interferometer.

15. The drive balancing system according to claim 14 wherein the distance detector is a laser interferometer.

16. A disc balancing apparatus for a disc drive assembly wherein the drive assembly has a baseplate and a drive motor mounted on the baseplate and an annular recording disc mounted on a drive motor spindle, the disc having an outer edge, the balancing system comprising:

a controller operably connected to the drive motor; and means for adjusting the disc so as to minimize its non-concentricity with respect to the drive motor spindle.

17. The disc balancing apparatus according to claim 16, further comprising:

means for determining a once per revolution (OPR) position error for the disc as the disc is spun on the drive motor spindle, wherein the adjusting means positions the disc on the drive spindle to minimize the OPR position error.

18. The disc balancing apparatus according to claim 17, wherein the determining means comprises:

means for measuring a plurality of distances from the disc outer edge at various phase angles to a predetermined location as the disc is spun on the drive motor spindle, wherein the determining means determines the OPR position error using the plurality of measured distances.

19. The disc balancing apparatus according to claim 18, wherein the measuring means is an interferometer.

* * * * *